United States Patent
Cantrell et al.

(10) Patent No.: US 12,132,563 B2
(45) Date of Patent: Oct. 29, 2024

(54) SYSTEM AND METHOD FOR DATA HANDLING OF LINKED EARTH-SPACE LAYERS WITH OPTIONAL HEAVY COMPUTATION

(71) Applicant: Phantom Space Corporation, Tucson, AZ (US)

(72) Inventors: James Cantrell, Tucson, AZ (US); Michael D'Angelo, Tucson, AZ (US); Jack Fox, Orlando, FL (US)

(73) Assignee: PHANTOM SPACE CORPORATION, Tuscon, AZ (US)

( * ) Notice: Subject to any disclaimer, the term of this patent is extended or adjusted under 35 U.S.C. 154(b) by 152 days.

(21) Appl. No.: 17/534,535

(22) Filed: Nov. 24, 2021

(65) Prior Publication Data

US 2022/0166497 A1 May 26, 2022

Related U.S. Application Data

(60) Provisional application No. 63/142,817, filed on Jan. 28, 2021, provisional application No. 63/118,069, filed on Nov. 25, 2020.

(51) Int. Cl.
| | | |
|---|---|---|
| *H04B 7/185* | (2006.01) | |
| *G06Q 20/06* | (2012.01) | |
| *H04B 7/195* | (2006.01) | |

(52) U.S. Cl.
CPC ....... *H04B 7/18521* (2013.01); *G06Q 20/065* (2013.01); *H04B 7/195* (2013.01)

(58) Field of Classification Search
CPC ... H04B 7/18521; H04B 7/195; G06Q 20/065
(Continued)

(56) References Cited

U.S. PATENT DOCUMENTS

| | | | | |
|---|---|---|---|---|
| 2017/0026108 A1* | 1/2017 | Haziza | ................... | H04L 7/043 |
| 2017/0214462 A1* | 7/2017 | Busche | ................. | H04B 10/29 |

(Continued)

FOREIGN PATENT DOCUMENTS

| | | | | |
|---|---|---|---|---|
| CA | 2590268 C | * | 7/2014 | .......... H04B 7/1853 |
| WO | WO-2021034906 A1 | * | 2/2021 | ......... H04B 7/18504 |

OTHER PUBLICATIONS

Xie et al; Satellite-Terrestrial Integrated Edge Computing Networks: Architecture, Challenges, and Open Issues ; Jun. 2020 ; IEEE Network; pp. 1-8. (Year: 2020).*

(Continued)

*Primary Examiner* — Amritbir K Sandhu
(74) *Attorney, Agent, or Firm* — STIP Law Group, LLC

(57) ABSTRACT

A system, architecture and method for data handling, computation, and communication for Earth-based and space-based activities through the use of ground and space-based systems. The system architecture may include a Core Space Layer. The system architecture may further include an Earth User Layer, a Relay Layer, a Computing Layer, a Terrestrial Communications Layer, and a Space User Layer. The Computing Layer is a cloud-based architecture that serves to reduce bandwidth burdens on Earth-Space trunk by processing data into manageable streams of information. The Core Space Layer contains LEO satellites, one of which may act as a dedicated computing node. The Core Space Layer may operate in a public and/or private mode with a first constellation of LEO satellites operating in a private mode and a second constellation of LEO satellites operating in a public mode.

20 Claims, 6 Drawing Sheets

(58) Field of Classification Search
USPC .......................................................... 398/115
See application file for complete search history.

(56) References Cited

U.S. PATENT DOCUMENTS

2020/0119811 A1* 4/2020 Kay .................. H04B 7/18541
2020/0196209 A1* 6/2020 Cui ...................... H04W 36/12

OTHER PUBLICATIONS

Israel et al;LEO Small-Satellite Constellations for 5G and Beyond-5G Communications; Oct. 2020; IEEE Access; pp. 1-10. (Year: 2020).*
Klaus et al; Optical Link Study Group Final Report ; Jun. 2012; OLSG final report; pp. 1-164. (Year: 2012).*
Esa et al; Blockchain and earth observation; Apr. 2019; European Space Agency; pp. 1-28. (Year: 2019).*

* cited by examiner

SYSTEM AND METHOD FOR DATA HANDLING OF LINKED EARTH-SPACE LAYERS WITH OPTIONAL HEAVY COMPUTATION

CROSS-REFERENCE TO RELATED APPLICATIONS

This application claims the benefit of Provisional U.S. Patent Application No. 63/118,069, filed Nov. 25, 2020, and 63/142,817, filed Jan. 28, 2021, the entire disclosures of which are herein incorporated by reference.

BACKGROUND OF THE PRESENT INVENTION

The present invention relates to the field of aerospace and telecommunication and, in particular, to orbital placement of a system and method for data handling. More particularly, the present invention relates to a system, architecture and method for data handling, computation and communication for both Earth-based and space-based activities through the use of ground and space-based systems.

Spacecraft missions in Earth orbit can be in orbits with altitudes ranging from low to medium to high. Low Earth orbit (LEO) can be defined as less than 2,000 km (1,200 miles) and as low as 160 km (100 miles). Medium or intermediate Earth orbits (MEO) are just below geosynchronous Earth orbit (GEO) at 35,786 km (22,236 miles) to as low as 2,000 km (1,200 miles). High Earth orbits (HEO) are geosynchronous or higher.

Orbits can be circular or elliptical depending on mission needs. Orbital inclination is the degree above or below the equator that defines the spacecraft's orbital plane. Some spacecraft have the capability to change their orbital plane through the use of onboard propulsion. Multiple spacecrafts in multiple orbits communicating with one another can be referred to as a spacecraft constellation.

GEO satellites rotate with the Earth and are directly above the equator staying above one place on Earth. Satellites in HEO orbits move relatively slowly over areas of interest on Earth and faster over other areas. MEO and LEO satellites are placed in circular orbits. GEO and HEO satellites have latency issues due to greater distances from Earth in comparison to MEO and LEO satellites which are at lower altitudes. A constellation of LEO satellites can provide continuous world-wide coverage providing stronger signals and faster connections utilizing smaller antennas with lower power.

Many data handling, computation and communications systems have been designed, manufactured and operated with a variety of unique attributes. However, the state of the art is limited by a combination of physical limitation, regulatory limitations, and practical constraints imposed by the line-of-sight viewing geometry from Earth-to-Space and Space-to-Space. The combination of these limits with today's architecture of single satellites communicating directly with discrete ground stations limits the bandwidth between Space objects and Earth communication layer to Mbits per second and for duty cycles on the scale of an hour a day.

SUMMARY OF THE INVENTION

The present invention overcomes the shortcomings of existing systems and addresses the needs noted above by providing a system, architecture and method for data handling, computation and communication for both Earth-based and space-based activities through the use of ground and space-based systems.

More specifically, the present invention includes a system architecture made up of, but not limited to, six separate layers including an Earth User Layer, a Relay Layer, a Computing Layer, a Terrestrial Communications Layer, a Core Space Layer, and a Space User Layer.

The architecture is user-customizable and highly flexible and can additionally accommodate end users that are space and Earth-based who possess varying levels of requirements for security, trust, bandwidth, and computation-all the while being agnostic to the physical location from which the Earth-based end user seeks to initiate access. It also obviates, in cases where it's desired or required, the Relay Layers and establishes a point-to-point network between Earth-based users and ground infrastructure (including the Internet or cell towers) and direct access to the space-based assets which provide data to the Space User Layer.

The present invention provides both Earth-based and space-based end users a robust bidirectional infrastructure to rapidly move data through a trusted, secure, high bandwidth network with access to inline heavy computational capability at a low price point that is ultimately agnostic to the geographic end point of the user, whether Earth or space-based. The Core Space Layer may have about sixty (60) satellites in six (6) orbital planes that are about thirty (30) degrees apart (10 satellites per plane) at an inclination of 88.6 degrees at an altitude of 1,200 km. This will provide nearly full coverage of the Earth's surface as well as connectivity to the Space User Layer. The number of satellites also provide for full functionality of the data processing and packetization. The satellites are cross-linked using RF and/or optical send and receive antennas on four sides of each satellite. The Core Space Layer has connectivity to the ground station(s) as well as mobile devices. The satellites are in the 180 kg maximum launch mass SmallSat class. Each satellite has greater than 100 TB storage capacity and redundant processors of greater than 5 GHz clock speed. The sixty (60) satellites provide the initial capability and additional spacecraft provided either internally or via third party to the six (6) orbital planes increase the overall system capabilities.

The Space User Layer has one satellite in a geosynchronous orbit centered approximately over the first ground station located within Arizona or New Mexico. This area is considered to have most sunny days in the Continental United States (CONUS) which allows for use of an optical link between the satellite and the ground station. This coverage provides initial system functionality across nearly the entirety of North and South America as well as connectivity to the Core Space Layer. The satellite(s) are larger than the 180 kg maximum launch mass SmallSat class. Additional spacecraft provided either internally or via third party to a geosynchronous orbit increase the coverage to other continents.

Users of such a capability that the present invention encompasses vary widely and include, but are not limited to, those engaged in warfighter activities, elite hedge fund managers, precision farming, scientists, states and governments in need of specific data to inform decision making in connection to such activities that vary even more widely than the spectrum of end users themselves.

Other aspects and advantages of the present invention will become apparent from the following description of the present invention, which refers to the accompanying drawings.

DETAILED DESCRIPTION OF THE INVENTION

Disclosed embodiments relate to system, architecture and methods for data handling, computation and communication for both Earth-based and space-based activities through the use of ground and space-based systems.

The terminology used herein is for the purpose of describing particular embodiments only and is not intended to limit the present invention. As used herein, the singular terms "a," "an," and "the" are intended to include the plural forms as well, unless the context clearly indicates otherwise.

Figure 1:
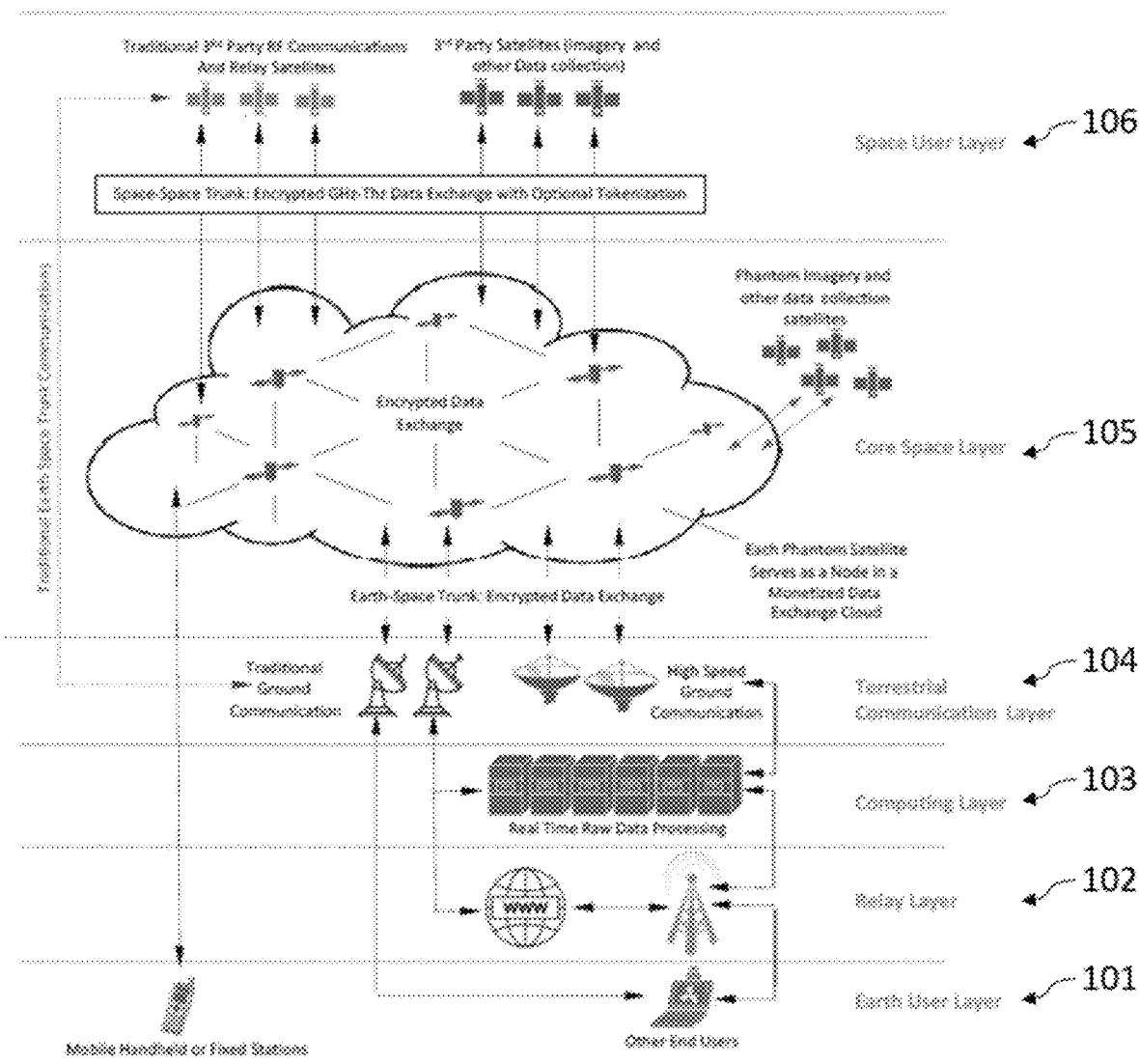
FIG. 1 illustrates a six-layer system architecture according to various embodiments of the present invention.
Figure 2:
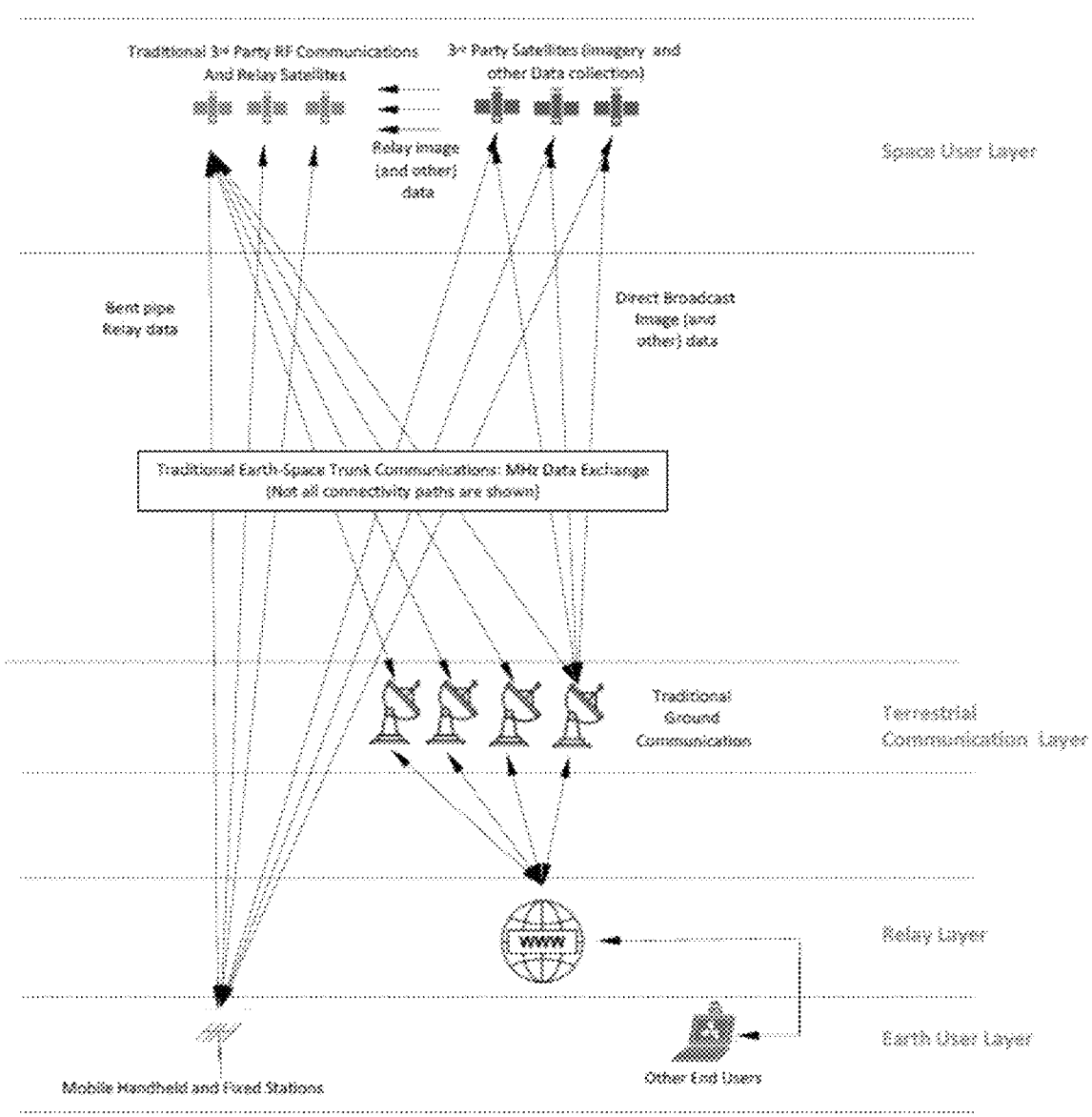
FIG. 2 illustrates conventional connectivity between Earth and space.

Referring now to the drawings, where like elements are designated by like reference numerals, FIG. 1 illustrates the system 100 in accordance with various embodiments of the present invention. The system 100 is made of six primary layers, as described below, and includes an Earth User Layer 101, a Relay Layer 102, a Computing Layer 103, a Terrestrial Communications Layer 104, a Core Space Layer 105, and a Space User Layer 106.

Earth User Layer

The Earth User Layer 101 may include handheld devices, other democratized mobile devices, computers, receive stations, and other devices that are nodes at the Earth-bound user level. The Earth User Layer 101 connects directly to the Relay Layer 102, the Computing Layer 103, the Terrestrial Communications Layer 104, and/or the Core Space Layer 105 depending on the inherent functionality of the devices enabling the Earth User Layer 101 and their need. Depending on the needs of the end user within the Earth User Layer 101, not all layers may be needed. For example, if an end user within the Earth User Layer is equipped with a proper satellite enabled device to communicate with the Core Space Layer, then the Relay and Terrestrial Communications Layers are not necessary. Likewise, if heavy computing is not needed, the Computing Layer becomes unnecessary and may be bypassed as well.

Many other such scenarios can be logically contemplated where the data flow may not pass from the Earth User Layer and then through all of the layers cited as part of the present invention. Data flow depends on end user needs, performance and functionality of the enabling devices possessed by users within the Earth User Layer.

Relay Layer

The Relay Layer 102 serves the purpose of providing connectivity from the Earth User Layer 101 into the Computing Layer 103 or the Terrestrial Communications Layer 104, depending on user needs. The Relay Layer 102 may leverage existing infrastructure to gain access to the Internet, cellular telecommunications infrastructure, or other conventional means. More preferably, the Relay Layer 102 may comprise a combination of proprietary connectivity means, based on a variety of methods including, but not limited to, line-of-sight microwave, optical fiber, copper lines or other radio frequency short and long-range communications systems. The Internet may also play a role in the Relay Layer 102, moving data as may be desired by the end user. In any case, if required, the Relay Layer 102 is designed to provide connectivity of the Earth User Layer 101 to the Computing Layer 103, Terrestrial Communications Layer 104 and ultimately, the Core Space Layer 105 in a manner that is secure, trusted, and at bandwidth performance in the GHz to THz range.

Computing Layer

The Computing Layer 103 is an inline cloud-based layer that serves as a waypoint for heavy computation, accessible by users from with either the Earth User Layer 101 or Space User Layer 106. The Computing Layer 103 effectively serves to reduce the bandwidth burdens imposed on the communication link between Earth and space ("Earth-Space trunk") by processing raw data into more manageable streams of information. Such computational capability is nominally realized on Earth and are well developed.

Terrestrial Communications Layer

The Terrestrial Communications Layer 104 comprises ground communications antennas, ground communication networks and end user communication terminals. It establishes one end of the bidirectional Earth-Space Trunk. Earth-based computational capabilities are well developed.

The Terrestrial Communications Layer may have traditional ground communication systems or high-speed ground communication systems. The Computing Layer 103 is preferably a public or a private cloud that provides IaaS (Infrastructure as a Service, for example, storage, CPU, memory, virtual machines), PaaS (Platform as a Service, for example, Windows/.NET, Linux/J2EE), and SaaS (Software as a Service, for example, CRM, ERP, email). The Relay Layer 102 and the Computing Layer 103 may be connected by known data communication conduits including public switched telephone network links, dedicated fiber optic cables, private or leased lines, virtual private networks (VPNs), Internet links, and the like.

Various protocols may be used for communication between Earth-based and space-based systems. For example, TCP/IP, UDP/IP, CCSDS (Consultative Committee for Space Data Standards), SCPS (Space Communications Protocol Standard), Xip-Link, MDP, and SkipWare.

Core Space Layer

The Core Space Layer 105 comprises a mesh network of communication satellites and establishes the other end of the bidirectional Earth-Space Trunk. These satellites comprise the satellite bus and optical and/or radio frequency Earth-Space and Space-Space communications systems. Once data from the Space User Layer 106 is resident within the Core Space Layer 105 it can take one or several of many paths, including, but not limited to, local processing and return transmission to the Space User Layer 106 over the Space- Space Trunk, local processing and transmission to the Terrestrial Communications Layer 104 over the Earth-Space Trunk, and local processing and transmission direct to the Earth User Layer 101.

The Core Space Layer 105 is tied together through a common protocol based on encrypted data blocks whose authenticity and trustworthiness is established by the nodes of the space network. This common protocol is driven by an open-sourced, or otherwise appropriate, operating system running aboard the Core Space Layer 105 whose sole objective is to process as many encrypted data blocks as quickly as possible and spread them to the remainder of the networks and into the end users of the Space User Layer 106 and Earth User Layers 101. New nodes can be added by third parties who adhere to the common protocol and utilize the operating system. Trust within this network increases with the number of transactions processed and elapsed time.

In an embodiment of the present invention, the Core Space Layer 105 may possess a Computing Layer. The Computing Layer may be resident within existing satellite nodes making up the Core Space Layer 105 or may be dedicated satellite nodes within the Core Space Layer 105 whose sole purpose is to provide heavy computing power to all users of the Core Space Layer 105.

Figure 3:
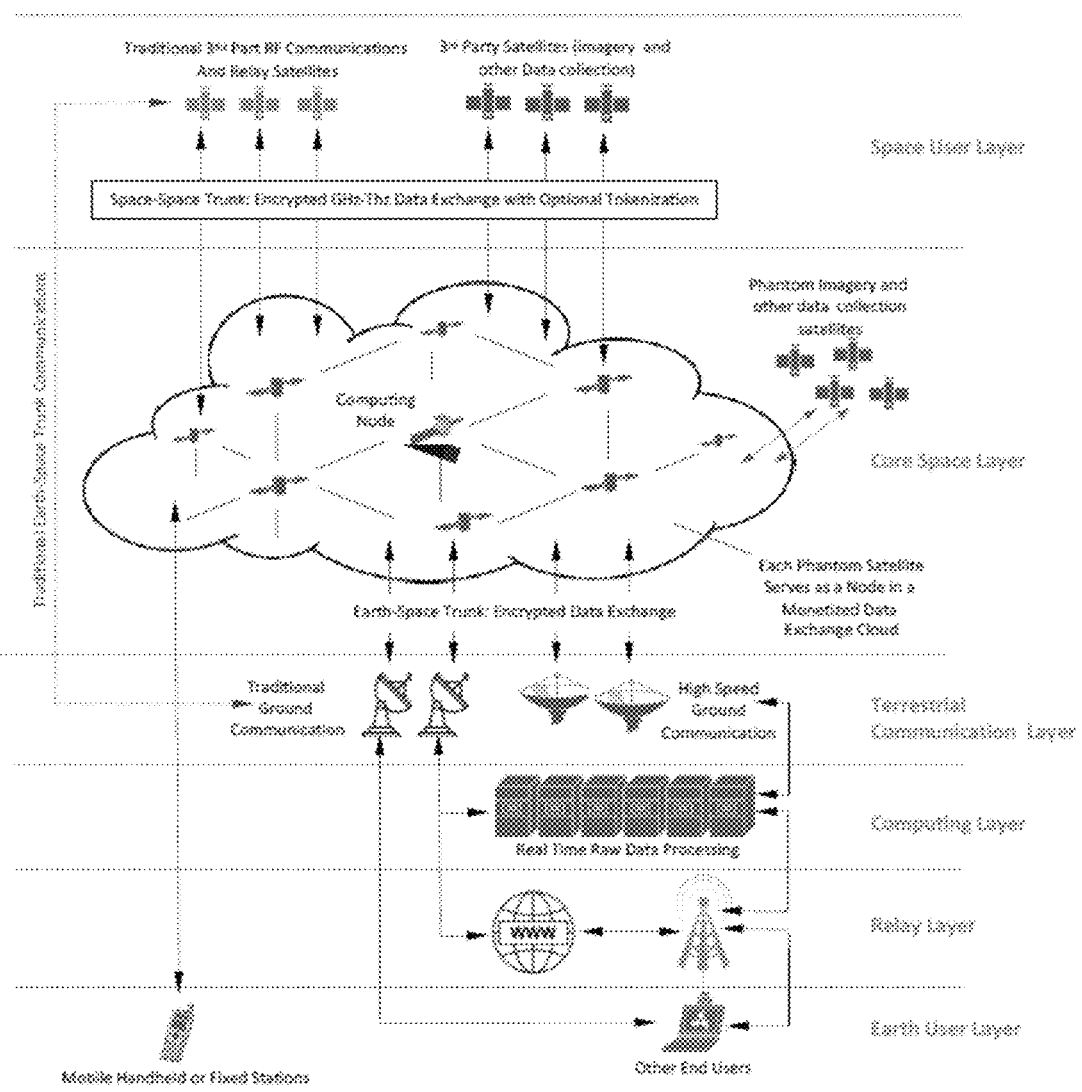
FIG. 3 illustrates a system architecture with a Computing Layer embedded in a Core Space Layer according to various embodiments of the present invention

In yet another embodiment of the present invention, as shown in FIG. 3, a single satellite node is inserted into the Core Space Layer 105 as a dedicated computing platform. The computational capability exists in the Core Space Layer 105 with one or more of the satellites that makes up the Core Space Layer 105 possessing such a computation capability and the power to support it, thereby reducing raw data whilst on orbit to a more refined and information dense data stream for ease of handling on the Earth-Space Trunk and along paths connecting the Core Space Layer 105 to Space User Layer 106 ("Space-Space Trunk").

Space-based computational capabilities are more limited to available power in space and state of the art in space processing. If the raw data is generated onboard spaceborne satellites, space-based computational nodes may be highly effective at enhancing the Earth-Space Trunk by several orders of magnitude. Such capability may enhance the efficiency of the system. It may also provide both Earth-based and space-based end users a robust bidirectional infrastructure to rapidly move data through a trusted, secure, high bandwidth network with access to heavy computational capability for low cost that is ultimately agnostic to the geographic end point for Earth-based users.

Figure 4:
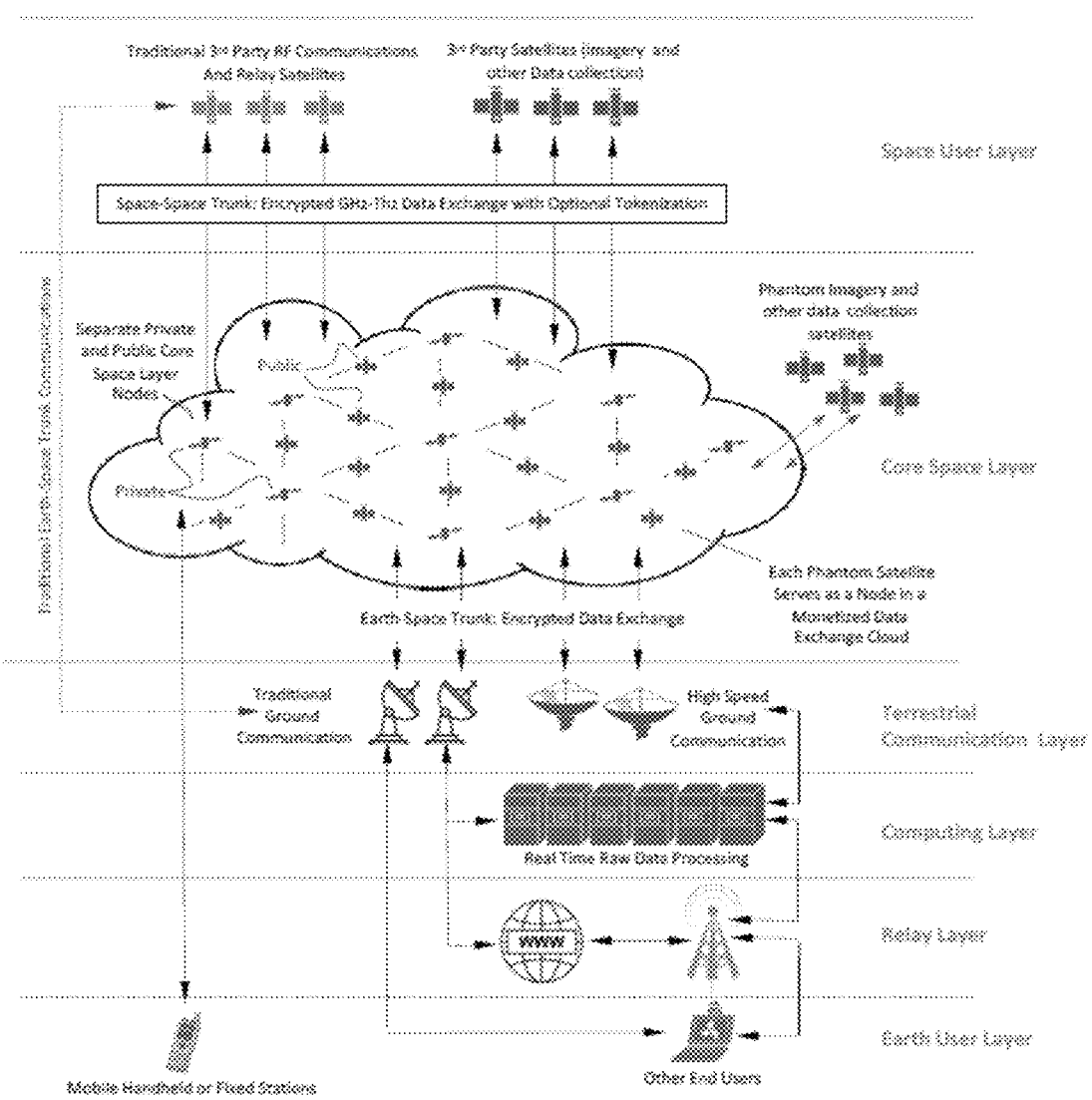
FIG. 4 illustrates a system architecture comprising a dual overlaid open (public designation) and closed (private designation) Core Space Layers according to various embodiments of the present invention.

In another embodiment of the present invention, both public and private data handling layers are enabled within the Core Space Layer 105 itself, resident within single satellite node configurations, as a separate constellation within the Core Space Layer 105, or as some combination of both. As shown in FIG. 4, a separate swarm of satellite nodes intermingled with the Core Space Layer 105 provides the two modes of operation, public and private. In the private mode, the security protocols are established to fit the need of a specific individual or group of end users. The security protocols can draw from many techniques known already to those well-versed in the state of the art, or they may be proprietary to the present invention drawing from blockchain enabled operating systems, or other advanced means.

In contrast, the public designation, made up of a constellation of satellite nodes within the Core Space Layer 105, is, by design, based on an open-source, or otherwise appropriate, operating system and architecture and may involve blockchain for trust, security and other attributes. The public designation is also designed to allow for the optional invitation of third party satellite nodes to connect to the public designation Core Space Layer 105 in order to expand its overall performance. Such baselining of blockchain, or other advanced means, into the public designation Core Space Layer 105 may also allow for tokenization of individual satellite nodes and/or the creation of a cryptocurrency ecosystem where the passage of data and use fees transactions are made in a cryptocurrency attributed to the Core Space Layer 105 itself.

Space User Layer

The Space User Layer 106 is an array of data producing assets, such as an imaging satellite, whose proprietary data becomes available to the Core Space Layer 105 through either encrypted transfer according to a pre-arranged per-bit fee structure, or, as is with the case with the public designation Core Space Layer 105, through cryptographic transactions initiated by the asset or a space-based end user leveraging blockchain to tokenize the satellite nodes. The Space User Layer 106 is connected to the Core Space Layer 105 through the Space-Space Trunk.

Figure 5:
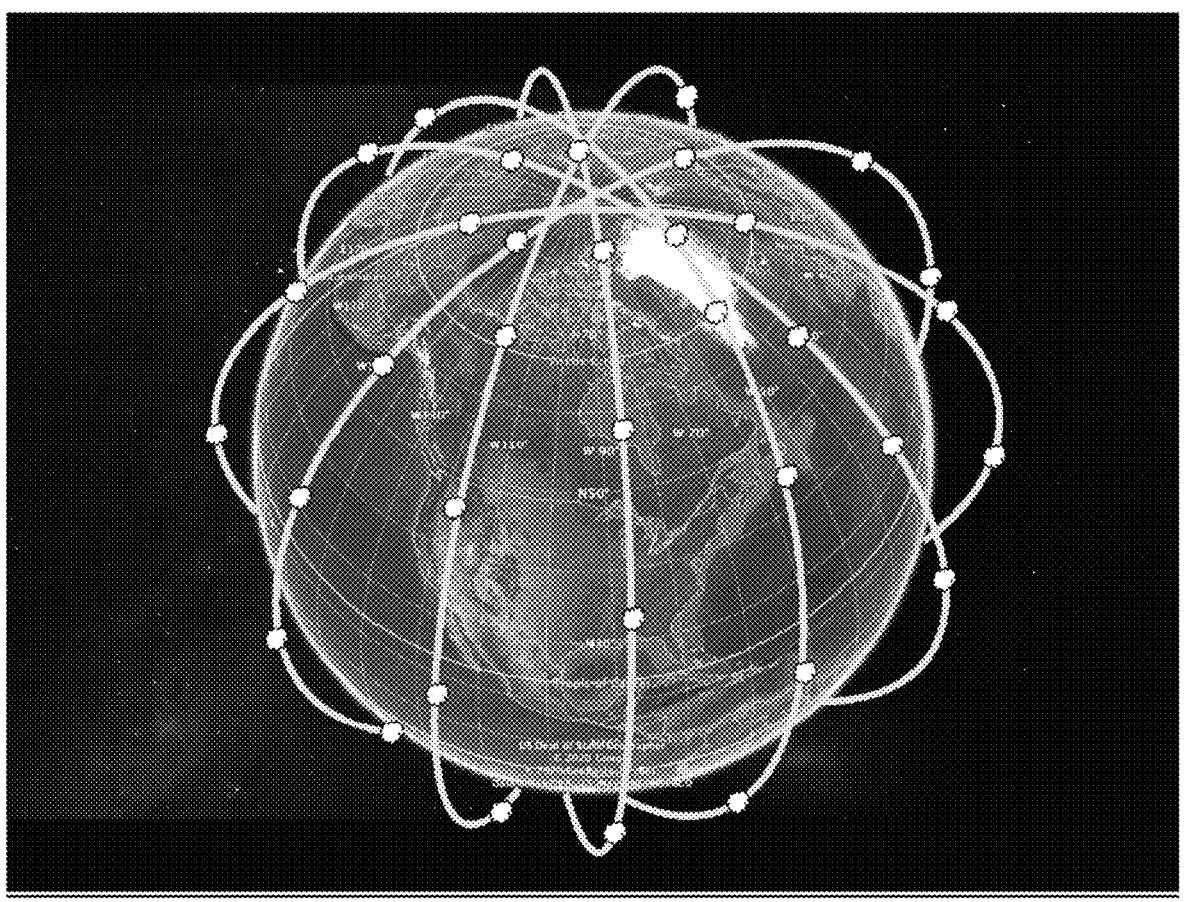
FIG. 5 illustrates a system comprising a Core Space Layer having a constellation of satellites according to various embodiments of the present invention.

FIG. 5 illustrates an example system in accordance with various embodiments of the present invention. For example, the Core Space Layer 105 may have about sixty (60) satellites in about six (6) orbital planes that are thirty (30) degrees apart (10 satellites per plane) at an inclination of 88.6 degrees at an altitude of 1,200 km. This will provide nearly full coverage of the Earth's surface as well as connectivity to the Space User Layer 106. This number of satellites also provide full functionality of the data processing and transmission of encrypted data blocks. The satellites may be cross-linked using RF and/or optical send and receive antennas on four sides of each spacecraft. The forward antenna is used to communicate with the next leading constellation satellite within the same orbit. The aft antenna is used to communicate with the next trailing constellation satellite within the same orbit. The side antennas are used to communicate with constellation satellites in adjacent orbits as well as the possible third party satellites within the constellation. Separate antennas are used to communicate with the ground station, mobile devices, and the satellite(s) in the Space User Layer 106 including possible third party satellites. The satellites are in the 180 kg maximum launch mass SmallSat class. Each satellite has greater than 100 TB storage capacity and redundant processors of greater than 5 GHz clock speed. The sixty (60) satellites provide the initial capability and additional spacecraft provided either internally or via third party to the six (6) orbital planes increase the overall system capabilities.

Figure 6:
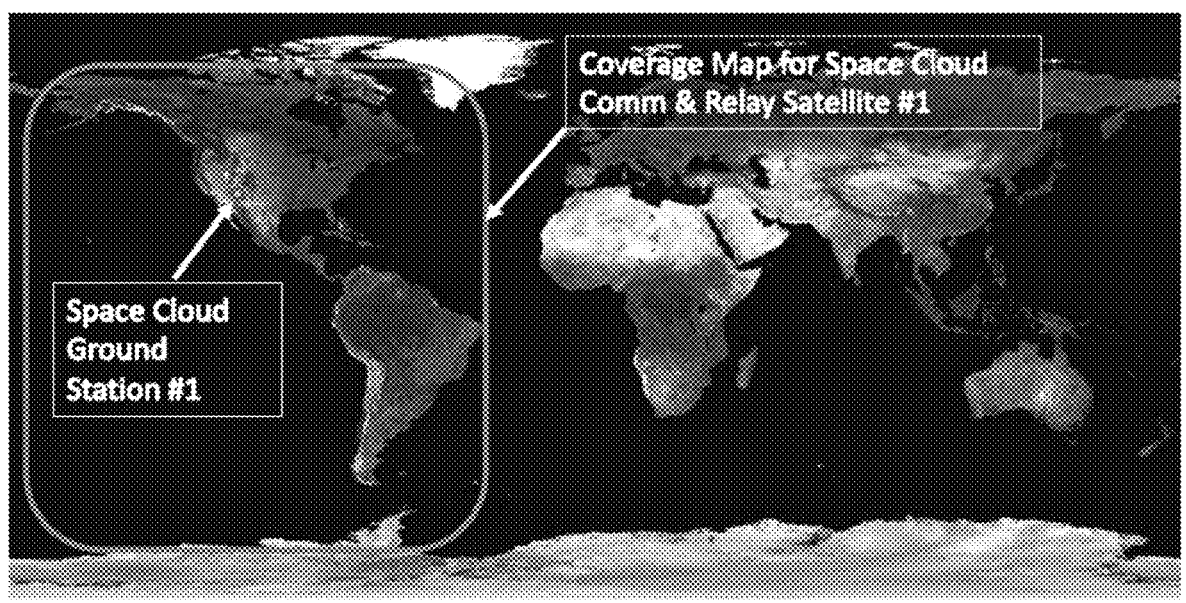
FIG. 6 illustrates a system comprising a Space User Layer according to various embodiments of the present invention.

As shown in FIG. 6, the Space User Layer 106 may have one satellite in a geosynchronous orbit centered approximately over the first ground station located within Arizona or New Mexico. This area is considered to have most sunny days in the Continental United States (CONUS) which allows for use of an optical link between the satellite and the ground station. This coverage provides initial system functionality across nearly the entirety of North and South America as well as connectivity to the Core Space Layer 105. The satellite is larger than the 180 kg maximum launch mass SmallSat class. Additional spacecraft provided either internally or via third party to a geosynchronous orbit increase the coverage to other continents. Additional ground stations with similar consistently sunny conditions will also add robustness to the system through data throughput, hardware and software redundancies, and extended coverage during relatively rare cloudy periods.

The geosynchronous satellite(s) may, for example, comprise satellites that are owned or operated by commercial entities or government and these satellites may utilize Ku (approximately 12-18 GHz) and/or Ka (approximately 27-40 GHz)–bands. Further, these GEO satellites may utilize various data communications standards such as IPoS, DVB-S2, and the like.

The LEOs may be Little LEOs, Big LEOs or Broadband LEOs based on the services provided by the LEOs. Each of these LEO satellites within a constellation may be cross-linked to several others providing better reliability and resiliency. These cross-links ensure that data can be rerouted and transmitted at fastest possible speeds providing redundancy and network optimization.

Each of the satellites in the Core Space Layer or Space User Layer may include an orbit adjustment system, a power system, a communication system, a computing system, and/or a payload. The orbit adjustment system maintains the satellite's orbit and separations between itself and other satellites with the constellation by actuating the satellite's propulsion to adjust its altitude and/or orbit. The power system includes solar panels and batteries and provides electrical power to the satellite. The communications system includes transceivers and antennas, the transceivers designed to multiplex/demultiplex, encode/decode, and compress/decompress, error correct and format data and/or signals. The computing system is linked to the orbit adjustment system, the communication system and the payload and manages their operations. The computing system may include several processors, IP routers, and other components.

The satellites may use inter-satellite links (ISL) to connect to satellites within a constellation and to connect to satellites in other constellations, and the on-board processors in these satellites perform signal regeneration and routing of IP traffic. IP routers on board each satellite determine the data path, handoff, capacity/load management, route management, load balancing and the like.

As described above, an improvement over the current state of art is to provide dual layers of both open (public designation Core Space Layer) and closed (private designation Core Space Layer) architectures where data generated from space-based satellites can move at very high speeds (Tb/sec) within the Core Space Layer at 100% duty cycle. This helps to more fully exploit the limited Space-Earth Trunk by increasing its duty cycle to levels approaching 100% and increase overall data throughput by an order of magnitude. Thus, data, once it reaches the Terrestrial Communications Layer, once again has a high-speed path back to end users through existing terrestrial communications channels that can move Tb/sec class data, augmented by the Relay Layer as needed.

Another improvement over the current state of the art is ubiquitous access to a global communication system that allows point-to-point communication on Earth through the Core Space Layer, thereby removing dependencies on other Earth-based infrastructure such as cellular telecommunications and the Internet.

Another improvement over the current stat of the art is to provide an open architecture with a public designation that invites third party users to join the constellation of the Core Space Layer nodes with monetary blockchain-enabled, or other advanced means, incentives to expand the coverage and performance. In such a configuration, the operating system of the public designation Core Space Layer could be open source, lowering barriers to entry for new entrants.

Another improvement over the current stat of the art, through a variety of means, blockchain included, is enhanced security made available to certain groups of users who seek a decentralized system where control is placed in the hands of those electing to become nodes within the space-based architecture.

Another improvement over the current stat of the art is that the present invention also enables location-agnostic access to the Core Space and Computing Layers anywhere an enabled mobile end user device resides, without the traditional need for access to conventional telecommunication or Internet. The system is completely self-sufficient with no additional assets required beyond the end-user access device, and in some cases the relay capability of the Relay Layer. The system is designed to decouple from the requirement of being proximate to far more heavy ground-based infrastructure, and instead allow all users to gain access to both heavy computing and robust space-based communications without being burdened by traditional encumbrances of land-line reliance, undersea cables, vulnerability to hacking and exploitation, excess access fees, and limitations of bandwidth.

There are many variants of the present invention that further enhance its effectiveness. For example, as an additional option, for the purpose of accessing larger and more comprehensive datasets, the system is designed to have a direct downlink and uplink to and from a server farm. Such server farm has the capability to spool up more resources as required by the incoming data, in order to provide near-real-time or real-time data processing. This compute layer has the capability to host machine learning or artificial intelligence algorithms to provide further enhanced access of data to the end user.

As discussed earlier it is also contemplated as part of the present invention to house a heavy computing layer within the Core Space Layer, thereby eliminating the need to pass data through the Earth-Space Trunk to the Earth-based Computing Layer. The Space User Layer optionally may include users whose activities originate not only from within other spacecraft and satellites, but from surface operations of remote celestial bodies. Any data source from any activity falls within the intent of the present invention.

The present invention also provides both open (public designation) and closed (private designation) architectures. In a closed architecture, the enabling components and protocols of the system as defined are proprietary and designed in accordance with the standards of specific groups of Earth or space-based end users. In an open architecture, the system is designed in a manner that facilitates open and ubiquitous use where satellites within the system serve in an analogous mode to nodes on a blockchain or blockchain-like system. In such an open system, the underlying operating system of the Core Space Layer becomes open sources and new entrants to the blockchain, or blockchain-line, expectedly join with their own satellite assets to expand the performance of all relevant metrics whether reach, functionality, trustworthiness, speed or some other differentiating attribute.

While the inventive concepts described herein with reference to illustrative embodiments for particular applications, it should be understood that the inventive concepts are not limited thereto. Those having ordinary skill in the art and access to the teachings provided herein will recognize additional modifications, applications, embodiments and substitution of equivalents all fall within the scope of the inventive concepts. Accordingly, the inventive concepts are not to be considered as limited by the foregoing description.

The invention claimed is:

1. A system for Earth-based and space-based activities, comprising:
a Core Space Layer, the Core Space Layer comprising a plurality of Low Earth Orbit (LEO) satellites, wherein each of the plurality of LEO satellites comprises satellite bus and optical and/or radio frequency Earth-Space and Space-Space communications systems, wherein the Core Space Layer is tied together through a common protocol based on encrypted data blocks, wherein the Core Space Layer provides two modes of operation, a public mode and a private mode, wherein the public mode enables baselining of blockchain and thereby allows tokenization of individual satellite modes and/or creation of a cryptocurrency ecosystem.

2. The system of claim 1, wherein each of the plurality of LEO satellites is in the 180 kg maximum launch mass SmallSat class.

3. The system of claim 1, wherein the plurality of LEO satellites comprises a first and a second constellations of the LEO satellites, wherein the first constellation operates in the private mode and the second constellation operates in the public mode.

4. The system of claim 1, wherein the plurality of LEO satellites are sixty satellites placed in six orbital planes that are 30 degrees apart at an inclination of 88.6 degrees and provide full coverage of the Earth's surface.

5. The system of claim 1, wherein one of the plurality of LEO satellites is a dedicated computing node providing a dedicated computing platform.

6. The system of claim 1, wherein each of the plurality of LEO satellites comprises a forward antenna configured to communicate with a next leading constellation satellite within the same orbit, an aft antenna configured to communicate with a next trailing constellation satellite within the same orbit, and side antennas configured to communicate with satellites in adjacent orbits.

7. The system of claim 1, further comprising:
an Earth User Layer, the Earth User Layer comprising devices that act as nodes at the Earth-bound user level;
a Relay Layer, the Relay Layer comprising communication systems;
a Computing Layer, the Computing Layer communicatively linked to the Relay Layer;
a Terrestrial Communications Layer, the Terrestrial Communications Layer comprising a plurality of ground communications antennas, ground communication networks, and end user communication terminals; and
a Space User Layer, the Space User Layer comprising at least one satellite, wherein the Space User Layer is connected to the Core Space Layer through a Space-Space Trunk,
wherein the Relay Layer provides connectivity from the Earth User Layer into the Computing Layer or the Terrestrial Communications Layer,
wherein the Terrestrial Communications Layer is communicatively linked to the Computing Layer and the Core Space Layer.

8. The system of claim 7, wherein the devices of the Earth User Layer comprise one or more of: a handheld device, a mobile device, a computer, and a receiving station.

9. The system of claim 7, wherein the at least one satellite within the Space User Layer is positioned over a first ground station located within Arizona or New Mexico.

10. The system of claim 1, wherein each of the plurality of LEO satellites comprises a forward antenna configured to communicate with a next leading constellation satellite within the same orbit, an aft antenna configured to communicate with a next trailing constellation satellite within the same orbit, and side antennas configured to communicate with satellites in adjacent orbits.

11. A system for Earth-based and space-based activities, comprising:
a Core Space Layer, the Core Space Layer comprising a plurality of Low Earth Orbit (LEO) satellites,
wherein each of the plurality of LEO satellites comprises satellite bus and optical and/or radio frequency Earth-Space and Space-Space communications systems, and
wherein the plurality of LEO satellites are sixty satellites placed in six orbital planes that are 30 degrees apart at an inclination of 88.6 degrees and provide full coverage of the Earth's surface.

12. The system of claim 11, wherein each of the plurality of LEO satellites is in the 180 kg maximum launch mass SmallSat class.

13. The system of claim 11, wherein the Core Space Layer is tied together through a common protocol based on encrypted data blocks.

14. The system of claim 11, wherein the plurality of LEO satellites comprises a first and a second constellations of the LEO satellites, wherein the first constellation operates in a private mode and the second constellation operates in a public mode.

15. The system of claim 11, wherein one of the plurality of LEO satellites is a dedicated computing node providing a dedicated computing platform.

16. A system for Earth-based and space-based activities, comprising:
a Core Space Layer, the Core Space Layer comprising a plurality of Low Earth Orbit (LEO) satellites, wherein each of the plurality of LEO satellites comprising satellite bus and optical and/or radio frequency Earth-Space and Space-Space communications systems, wherein the Core Space Layer is tied together through a common protocol based on encrypted data blocks;
an Earth User Layer, the Earth User Layer comprising devices that act as nodes at the Earth-bound user level;
a Relay Layer, the Relay Layer comprising communication systems;
a Computing Layer, the Computing Layer communicatively linked to the Relay Layer;
a Terrestrial Communications Layer, the Terrestrial Communications Layer comprising a plurality of ground communications antennas, ground communication networks, and end user communication terminals; and
a Space User Layer, the Space User Layer comprising at least one satellite, wherein the Space User Layer is connected to the Core Space Layer through a Space-Space Trunk,
wherein the Relay Layer provides connectivity from the Earth User Layer into the Computing Layer or the Terrestrial Communications Layer, and
wherein the Terrestrial Communications Layer is communicatively linked to the Computing Layer and the Core Space Layer.

17. The system of claim 16, wherein each of the plurality of LEO satellites is in the 180 kg maximum launch mass SmallSat class.

18. The system of claim 16, wherein the plurality of LEO satellites comprises a first and a second constellations of the LEO satellites, wherein the first constellation operates in a private mode and the second constellation operates in a public mode.

19. The system of claim 16, wherein the plurality of LEO satellites are sixty satellites placed in six orbital planes that are 30 degrees apart at an inclination of 88.6 degrees and provide full coverage of the Earth's surface.

20. The system of claim 16, wherein one of the plurality of LEO satellites is a dedicated computing node providing a dedicated computing platform.

* * * * *